US005742982A

United States Patent [19]
Dodd et al.

[11] Patent Number: 5,742,982
[45] Date of Patent: Apr. 28, 1998

[54] CABLE STRAIN RELIEF APPARATUS

[75] Inventors: Joseph K. Dodd, Lee's Summit, Mo.; J. D. Harvey, Trophy Club, Tex.; Mark D. Walters, Colleyville, Tex.; Kevin L. Morgan, Paradise, Tex.

[73] Assignee: Siecor Corporation, Hickory, N.C.

[21] Appl. No.: 756,320

[22] Filed: Nov. 25, 1996

[51] Int. Cl.$^6$ .................... F16C 1/10; F16L 3/00
[52] U.S. Cl. .............. 24/16 R; 248/74.1; 248/68.1; 24/518
[58] Field of Search ............... 24/16 R, 518, 24/540, 489, 570; 248/74.1, 72, 68.1, 226.12

[56] References Cited

U.S. PATENT DOCUMENTS

| 2,396,925 | 3/1946 | Morehouse | 248/68.1 |
|---|---|---|---|
| 2,683,578 | 7/1954 | Rainey | 248/68.1 |
| 2,902,821 | 9/1959 | Kelly, Jr. | 248/68.1 X |
| 2,972,461 | 2/1961 | Balbach et al. | 248/68.1 |
| 3,054,586 | 9/1962 | Kirkup | 248/74.1 |
| 3,061,253 | 10/1962 | Keaton | 284/74.1 |
| 3,906,592 | 9/1975 | Sakasegawa et al. | 248/68.1 |
| 4,059,872 | 11/1977 | Delesandri | 248/74.1 X |
| 4,285,486 | 8/1981 | Von Osten et al. | 24/518 X |
| 4,558,494 | 12/1985 | Kraus | 24/297 |
| 4,715,571 | 12/1987 | Soltow et al. | 248/68.1 |
| 4,808,774 | 2/1989 | Crane | 174/135 |
| 4,839,471 | 6/1989 | Clark et al. | 174/92 |
| 4,865,280 | 9/1989 | Wollar | 248/68.1 |
| 5,027,478 | 7/1991 | Suhr | 24/16 R |
| 5,261,633 | 11/1993 | Mastro | 248/74.1 |
| 5,280,138 | 1/1994 | Preston et al. | 248/56 X |
| 5,443,232 | 8/1995 | Kesinger et al. | 248/68.1 X |
| 5,458,019 | 10/1995 | Trevino | 74/502.4 |
| 5,481,939 | 1/1996 | Bernardini | 74/502.4 |

FOREIGN PATENT DOCUMENTS

| 1106953 | 8/1984 | U.S.S.R. | 248/68.1 |

OTHER PUBLICATIONS

AT&T 636-299-110-4, 12A2 Cable Clamp Installation for Nonmetallic Sheath Lightguide Cables, AT&T Practice Instruction Sheet; COMCODE 846 530 780; 1 page, Apr. 1994.

Primary Examiner—Peter M. Cuomo
Assistant Examiner—Robert J. Sandy

[57] ABSTRACT

A clamp assembly (10) is provided which can include first and second clamp halves (16, 18) with a base (50) mounted in each clamp path. The base has a cylindrical inner surface (54) which can clamp a cable thereto for strain relief. Alternatively, a flexible insert (86) having a plurality of cylindrical cavities (102) opening through the outer surface (100) thereof can receive a number of cables (12) to be clamped in the clamp assembly for strain relief. In another version, a plurality of nested inserts (106-116) can be provided on each base (50) allowing the selection of a particular insert dimension suitable the cable to be secured.

25 Claims, 8 Drawing Sheets

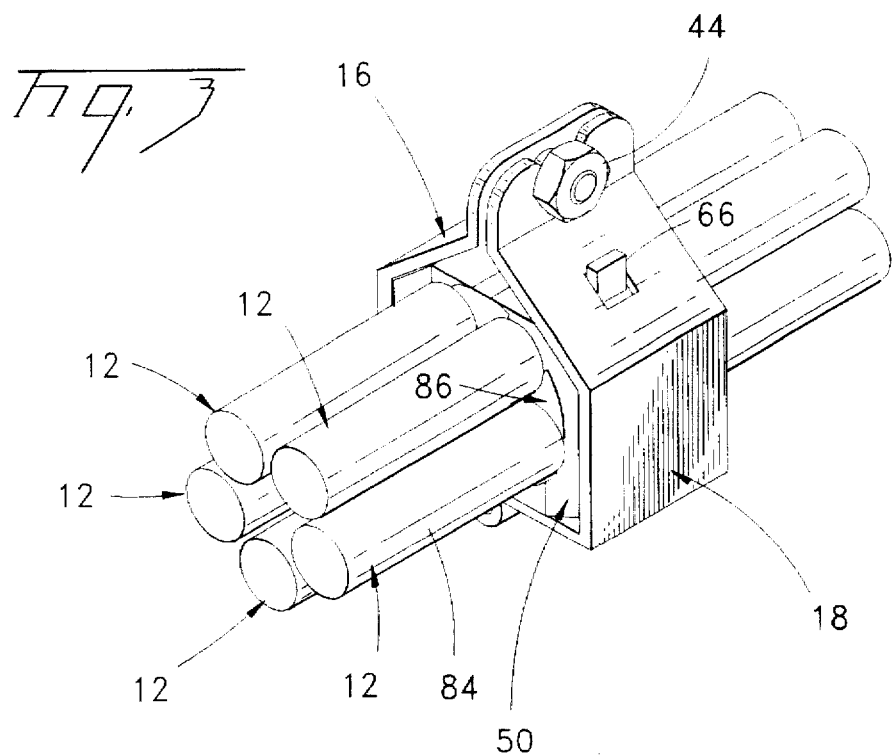
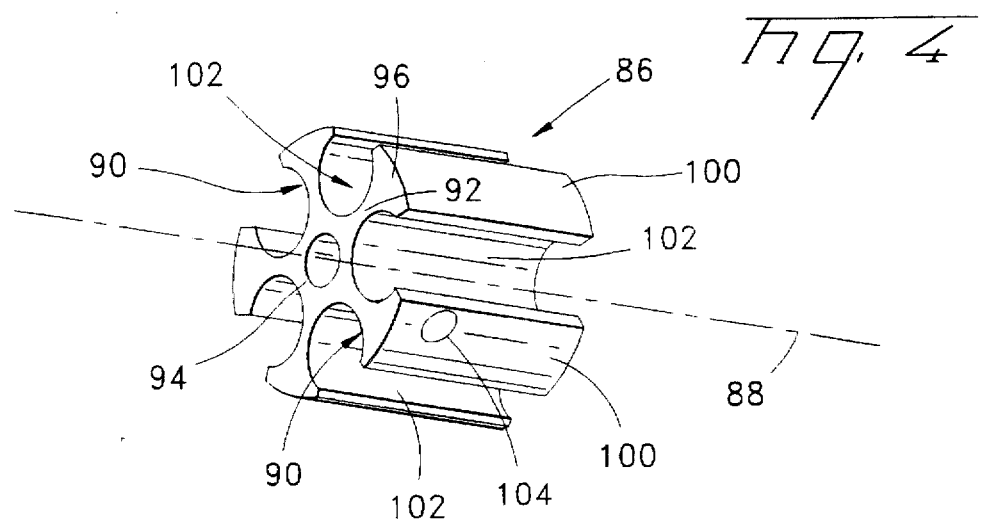

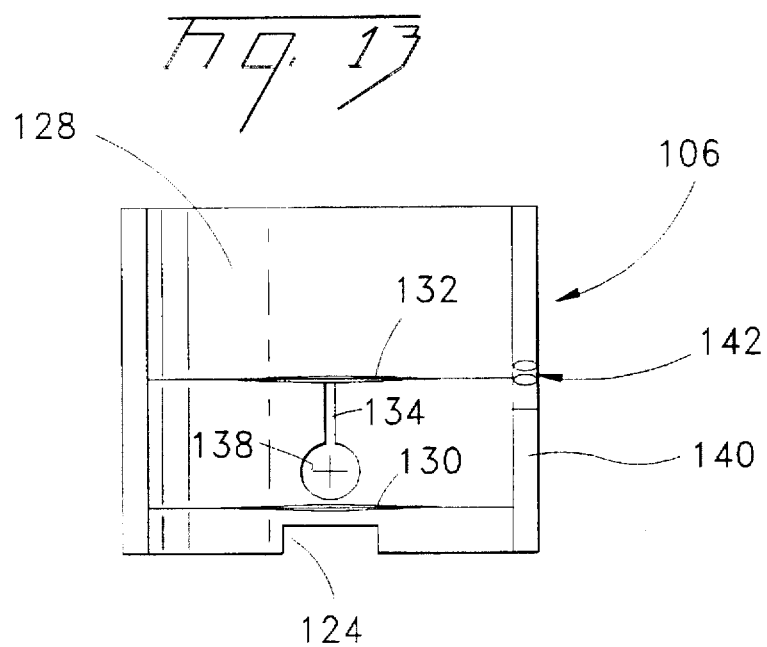
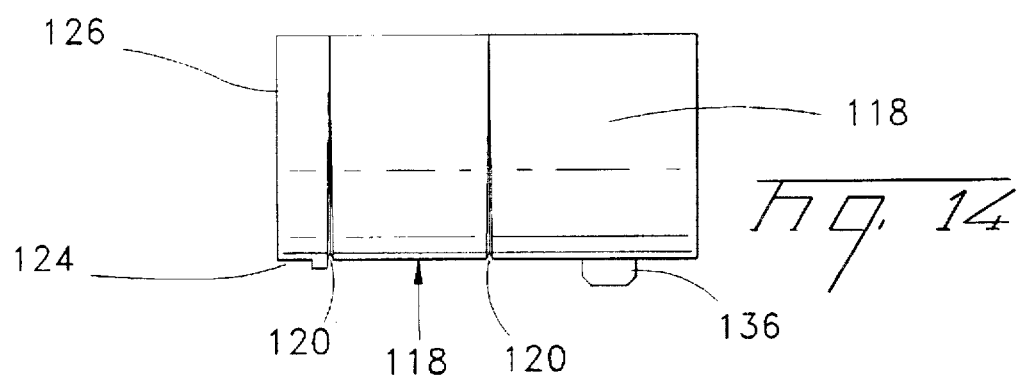
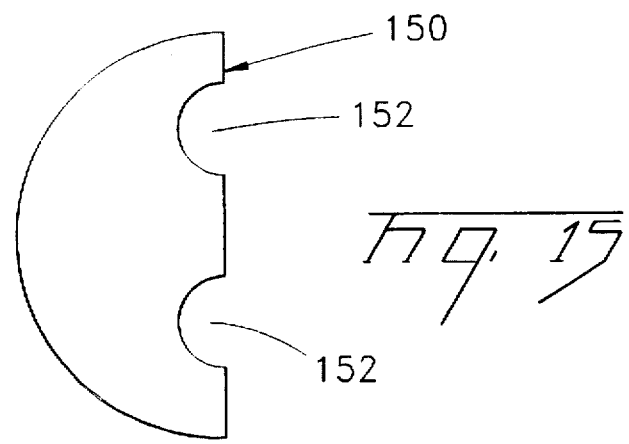

CABLE STRAIN RELIEF APPARATUS

TECHNICAL FIELD OF THE INVENTION

This invention relates to the supporting of cables, such as optical cables, to provide strain relief.

BACKGROUND OF THE INVENTION

When a cable, such as an optical fiber cable, is terminated in a junction box, or other device, it should be secured in such a way as to prevent any force applied to the cable from being transferred to the termination point. This is commonly referred to as strain relief. The absence of proper strain relief leaves the termination point vulnerable and unprotected, which could, in the event of an applied force on the cable, lead to partial or total loss of the cable's transmission performance.

A common method of strain relief is sheath retention. A clamp or tie is frictionally engaged with the outer sheath of the cable with the clamp or tie being secured to a fixed support. With tie wrapping, the cable is simply strapped to a fixed point using a tie wrap. Tie wrapping has the disadvantages of possible over-tightening of the tie wrap. If a tie wrap is tied too tightly, it may induce a loss of transmission performance, especially in fiber optic cables where microbending allows light to escape from the core, thereby degrading the signal. Cables with soft jackets are especially susceptible. This is a common problem since many craftsmen carry cable tie tools which, on the one hand, ease the installation of cable tie wraps, but unfortunately also tighten them very tight. Where many cables are terminated at a single point, the use of tie wrap often results in a messy jumble of cables since, unless a large area is available to which the cables may be individually tied down, the cables must be tied off in bundles or layers. In addition to lessening the neatness of the installation, this reduces the effectiveness of the strain relief since cables are more free to slide relative to the point of strain relief.

Another form of sheath retention strain relief is the use of clamps where the cable is squeezed inside a clamp or clam shell-like device. This has proven generally effective when used with fiber optic cables. However, clamps known in the industry accommodate only a single cable yet occupy a fairly large amount of space. This may be adequate for cable of larger fiber or conductor counts since a single cable may be capable of feeding a large service point, such as a connector or splice housing. However, if the same service point is fed by multiple smaller cables, this method requires a large number of clamps and thus a large amount of space in an environment which rarely has the space available.

SUMMARY OF THE INVENTION

In accordance with one aspect of the present invention, a clamp is provided for clamping a cable to a support. The clamp includes a first clamp half having a base, a hinged portion, a forward portion and a securing portion. A second clamp half is provided having a base, a hinged portion, a forward portion and a securing portion. The first and second clamp halves are hinged together at their hinge portions. The base of said first clamp half has at least one hole therethrough to receive a securing fastener to fasten the clamp to the support.

In accordance with another aspect of the present invention, a flexible insert is provided which has an outer circumference. A plurality of notches are formed in the insert opening through the outer circumference for receiving individual cables therein. The first and second clamp halves engage the flexible insert at the outer circumference.

In accordance with another aspect of the present invention, a first clamp base is provided which has a first projection engaging the forward portion of the first clamp half and a second projection engaging the hinge portion of the first clamp half, the first clamp base having an outer surface engaging the base of the first clamp half and a curved inner surface. The inner surface can be used to clamp to a cable or to receive an insert which, in turn, engages the cable.

In accordance with another aspect of the present invention, at least one insert is provided having a curved outer surface engaging the inner surface of the first clamp base and an inner surface curved to receive the cable. A plurality of nested inserts can be provided for selecting the cable size to be clamped.

BRIEF DESCRIPTION OF THE DRAWINGS

A more complete understanding of the invention and its advantages will be apparent from the following detailed description when taken in conjunction with the accompanying drawings in which:

FIG. 3 is a perspective view of the clamp assembly of FIG. 2 clamping cables therein;

FIG. 4 is a perspective view of a flexible insert used in the clamp assembly;

FIG. 13 is a plan view of the nested insert;

FIG. 14 is a side view of the nested insert; and

FIG. 15 is an end view of an insert for clamping a plurality of cables.

DETAILED DESCRIPTION

Figure 1:
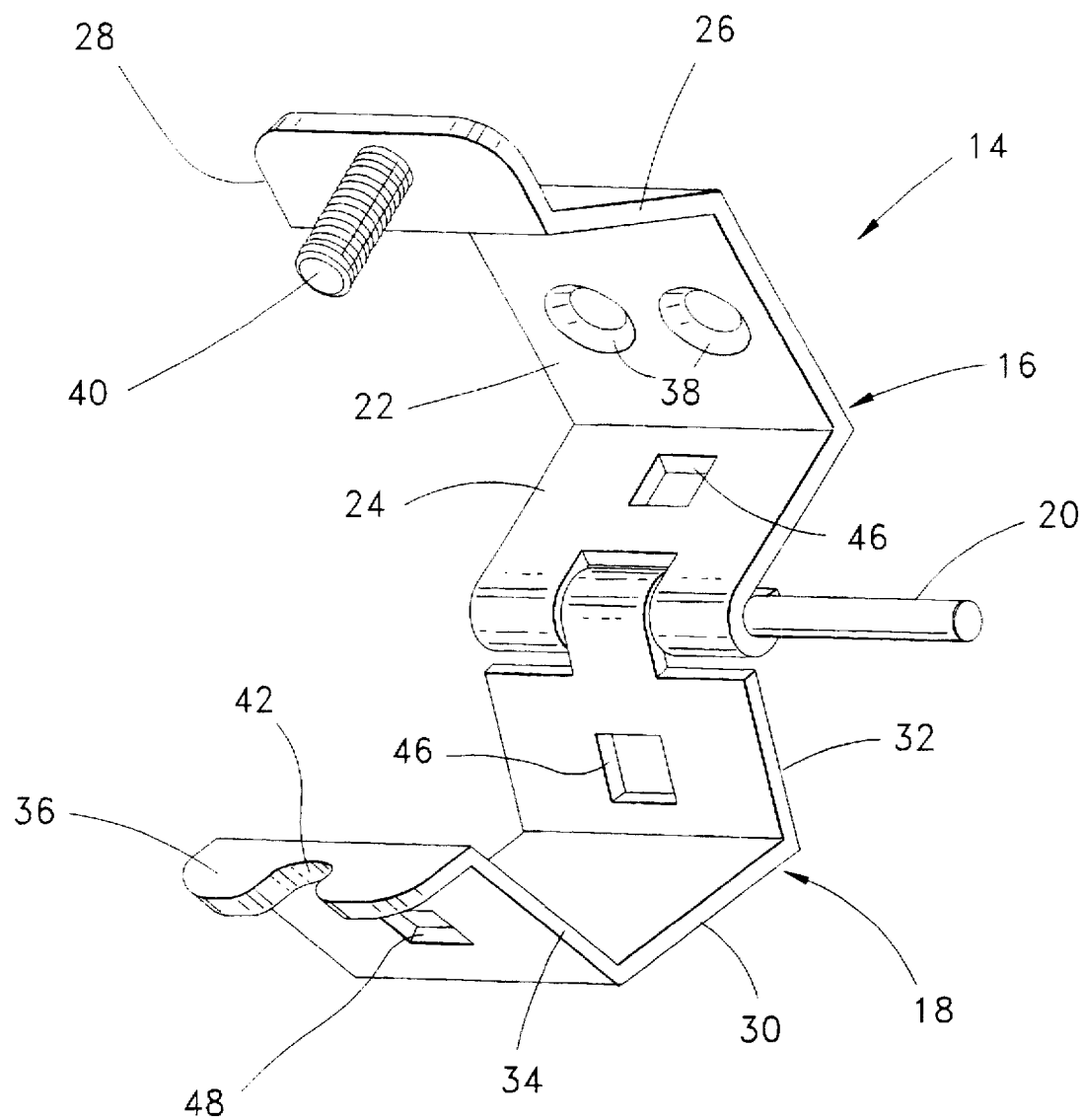
FIG. 1 is a perspective view of a clamp utilized in a first embodiment of the present invention.

Referring now to the drawings, wherein like reference characters designate like or corresponding parts throughout several views, and in particular to FIGS. 1–8, a clamp assembly 10 forming a first embodiment of the present invention is illustrated. The clamp assembly 10 is particularly suited for clamping fiber optic cables 12 therein but, it will be understood that other cables, such as electrical conductors, air lines and the like could be clamped as well.

The clamp assembly 10 includes a clamp 14, seen in FIG. 1, which includes a first clamp half 16 and second clamp half 18 connected together by a hinge pin 20. The first clamp half 16 can be seen to include a base portion 22, a hinge portion 24, a forward portion 26 and a fastening portion 28. Second clamp half 18 is similarly constructed with a base portion 30, a hinge portion 32, a forward portion 34 and a fastening portion 36. The base portion 22 of first clamp half 16 has a pair of countersunk apertures 38 therethrough to attach the first clamp half 16 to a fixed structure from which the cable or cables will be supported. Two flat head screws can fasten the first clamp half 16 to the support so it will not twist. While two apertures 38 are preferred to fasten the clamp to a support, a single aperture can be used or more than two apertures can be employed.

The hinge portions 24 and 32 can be seen to have mating elements receiving the hinge pin 20 to permit the second clamp half 18 to swing relative the first clamp half 16.

The fastening portion 28 of first clamp half 16 is provided with a permanently mounted threaded rod 40. The fastening portion 36 of second clamp half 18 is provided with a circular notch 42 so that fastening portion 36 can be moved into contact with fastening portion 28 when the clamp is closed, as seen in FIG. 3. A nut 44 can be threaded onto rod 40 to secure fastening portion 36 against fastening portion 28. Alternatively, apertures can be formed through both fastening portions 28 and 36 and a separate bolt and nut combination used to hold the clamp in the closed position.

As can be seen in FIG. 1, each of the hinge portions 24 and 32 has a square aperture 46 formed therethrough while each of the forward portions 26 and 34 has a square aperture 48 formed therethrough. The apertures 46 and 48 on each clamp half are generally aligned.

The hinge portion of each clamp half generally extends perpendicular from the base portion thereof. The forward portion, however, extends at an obtuse angle from the base portion, for example 130°. The fastening portion extends from the forward portion in a plane generally parallel with the base portion.

With reference to FIGS. 2 and 6–8, the base 50 mounted in the clamp 14 will be described. Each clamp utilizes two bases, one base received on each of the clamp halves. The bases as shown are identical.

Base 50 has an outer surface 52 and an inner surface 54. Outer surface 52 is a series of planar surfaces including a base surface 56, slanted surfaces 58 and 60 and vertical surfaces 62 and 64. A tab 66 extends outwardly from the slanted surface 60 while a snap fit lug 68 extends outwardly from the slanted surface 58. The inner surface 54 is a portion of a cylinder having an arc less than 180° with a predetermined radius R centered along axis 70. Ridges 72 and 74 extend upwardly from the inner surface 54 and generally extend in a plane perpendicular the axis 70. A ridge 76 extends upwardly from the inner surface 54 and extends generally parallel the axis 70. An aperture 78 is formed into the base 50 through the inner surface 54. A notch 80 is similarly formed into the base 50 at end 82 of the base through the inner surface 54.

Figure 2:
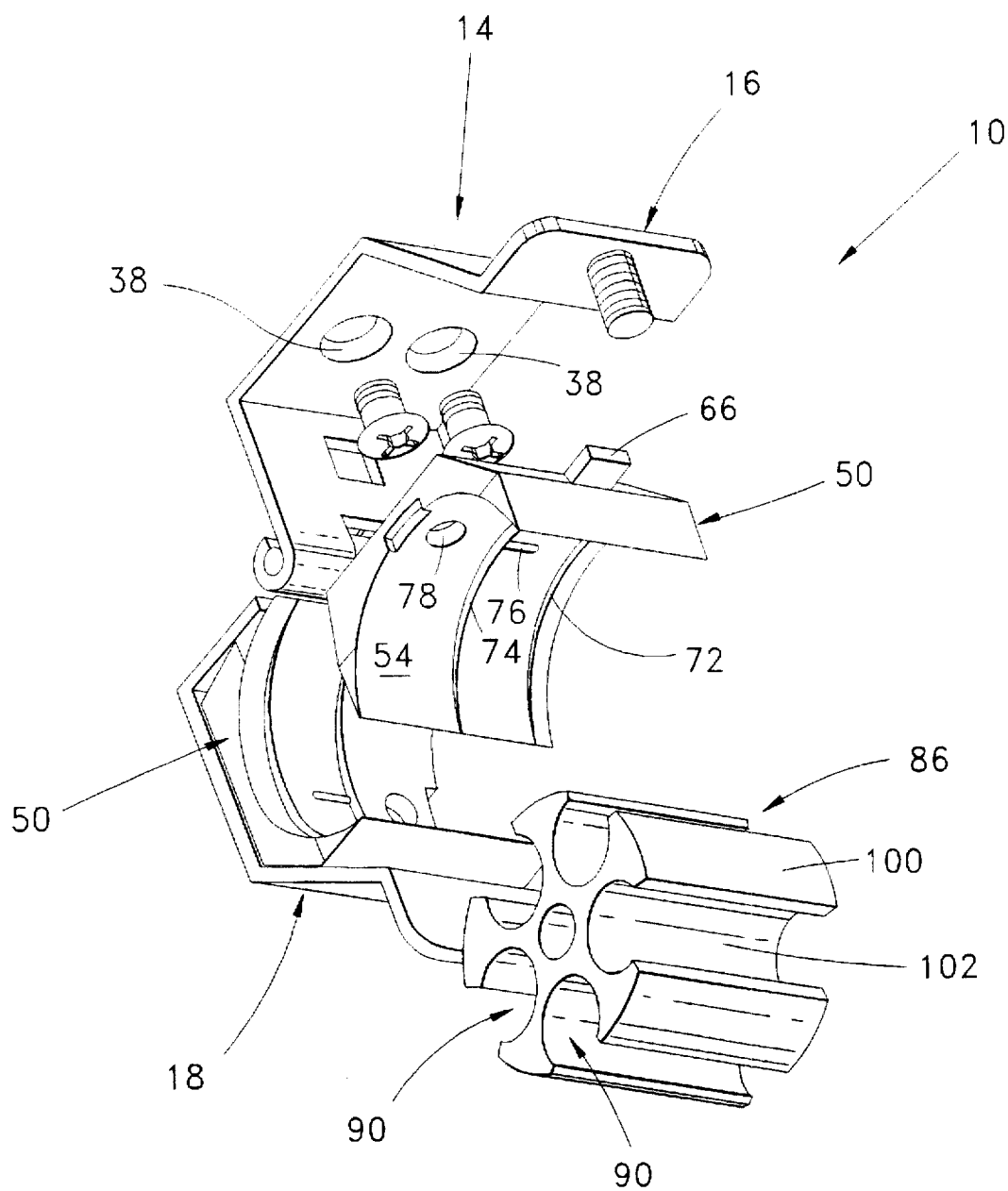
FIG. 2 is an exploded view of a clamp assembly forming first embodiment of the present invention with a flexible insert.

As can be understood from FIGS. 2 and 3, each base 50 can be snap fit into a clamp half 16 and 18 by initially inserting the tab 66 into the square aperture 48 in the forward portion of the respective clamp half and snapping the snap fit lug 68 into the square aperture 46 of the hinge portion thereof. Thus, a base 50 will be secured firmly within each clamp half.

With the assembly as described, the clamp assembly 10 can clamp a cable 12 therein having an outer radius of approximately R. The ridges 72, 74 and 76 will be forced into the sheath 84 of the cable 12 to enhance the clamping engagement between the clamp assembly 10 and the cable 12.

Figure 5:
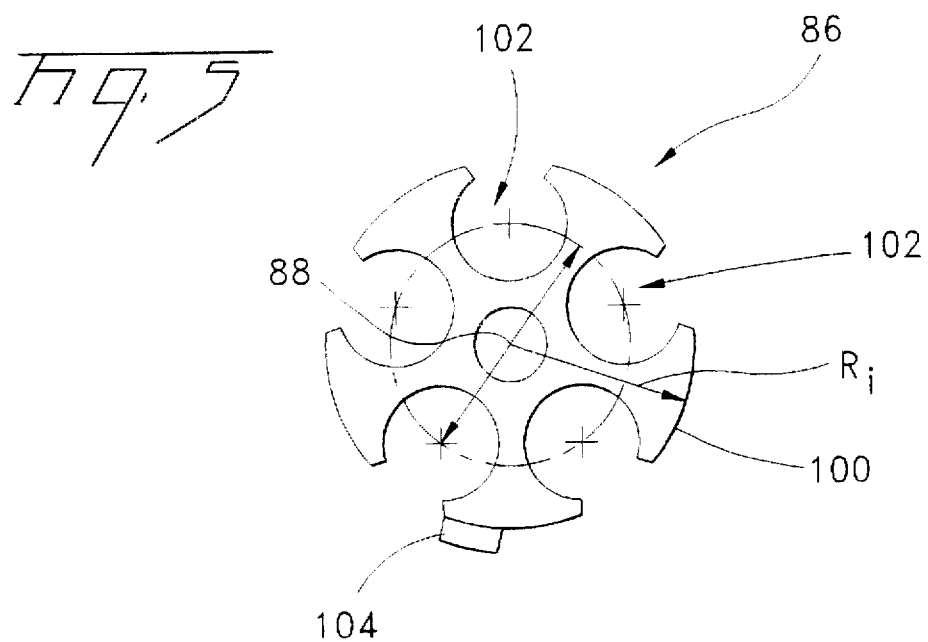
FIG. 5 is an end view of the flexible insert.
Figure 6:
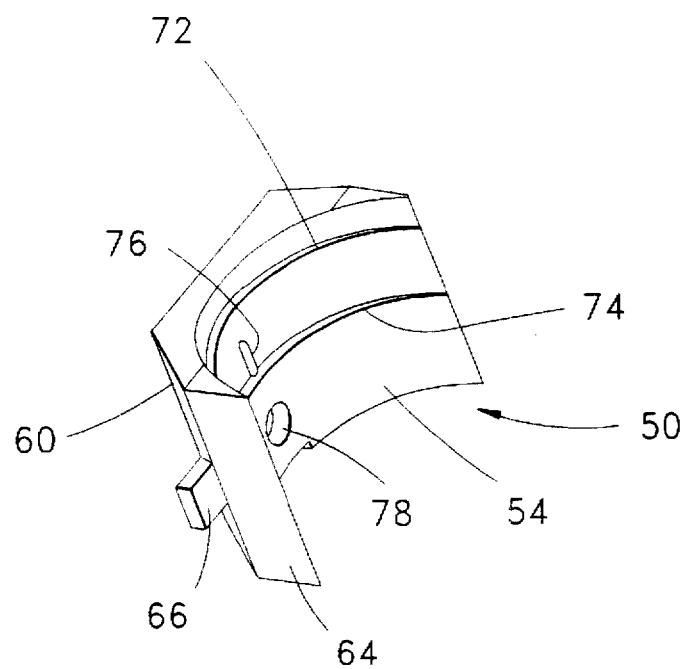
FIG. 6 is a perspective view of a base used in the clamp assembly.
Figure 7:
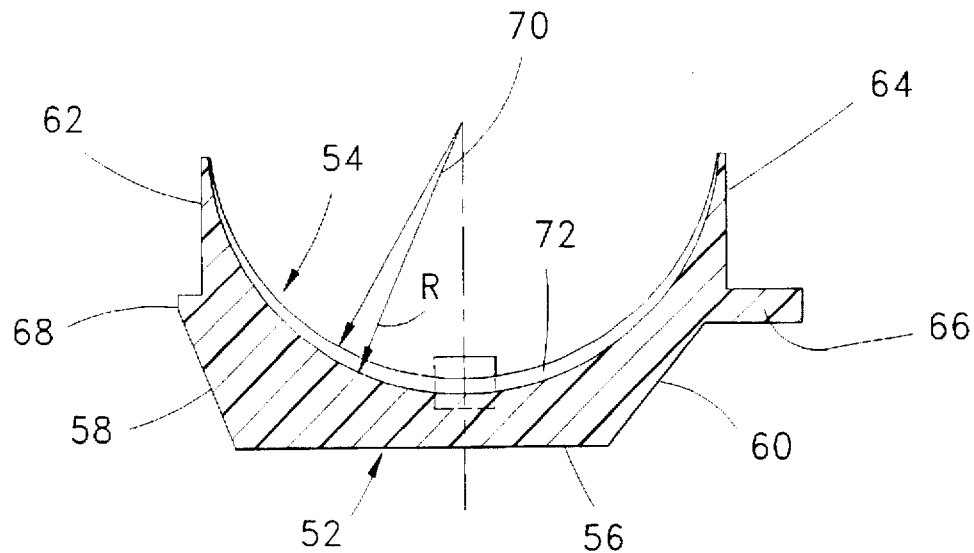
FIG. 7 is a side view of the base.
Figure 8:
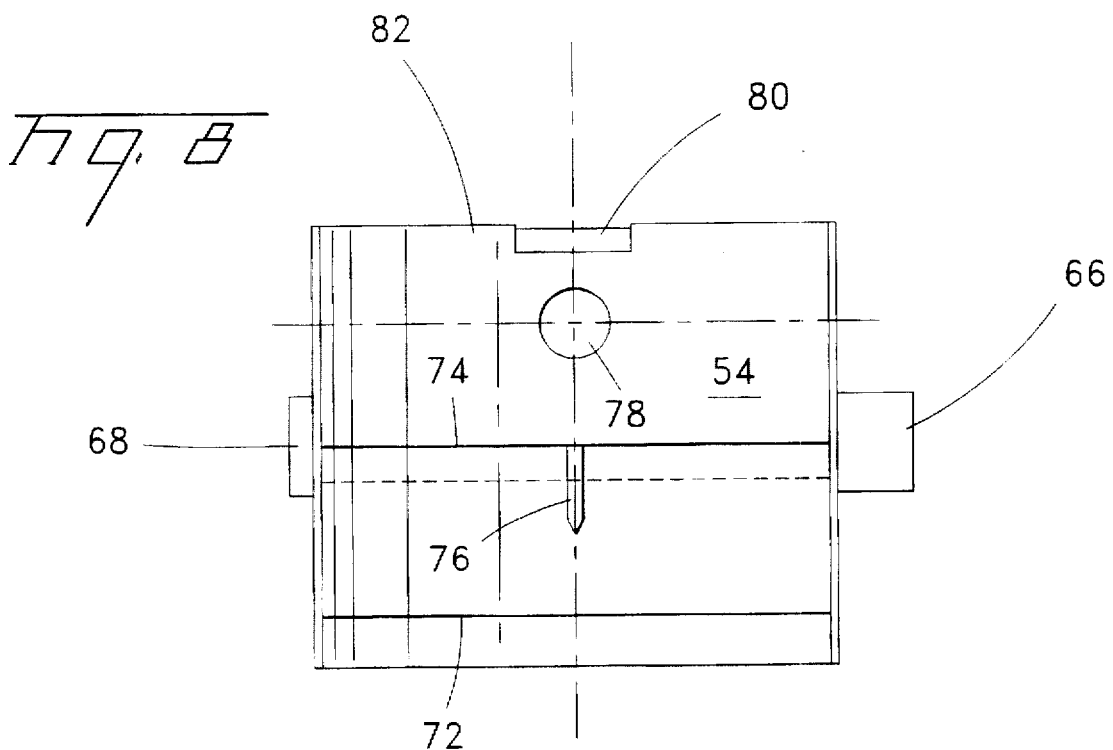
FIG. 8 is a plan view of the base.

With reference to FIGS. 2 and 5, a flexible insert 86 can be employed with clamp 14 and bases 50 to clamp one or more cables mounted therein. The flexible insert 86 is generally cylindrically shaped having an axis 88 with a core 94 concentric to axis 88 and five flexible spokes 90 extending radially outward from the core 94. Each spoke 90 has a relatively thin section 92 extending out from the core 94 of the insert which transitions into a wider head 96. Each of the heads 96 has an outer surface 100 which is curved about a radius $R_i$ centered on axis 88.

As can be seen in FIG. 3, individual cables 12 can be fit through the slots between adjacent heads 96 and into the cylindrical cavities 102 formed between each adjacent spoke 90. The cavities are formed so that little, if any, portion of the cable 12 in a cavity extends radially outward from a cylinder of radius $R_i$ containing the surfaces 100. The flexible insert 86 is formed of a material of sufficient flexibility so that the heads 96 and sections 92 will deform to allow a cable to be inserted into a cylindrical cavity 102.

When the cables to be strain relieved have been entered into the cavities, and it is clear from the figures that anywhere from one to five cables can be accommodated by the flexible insert 86 illustrated, the cables and insert are positioned between the bases 50 and the clamp 14 is closed and tightened with nut 44 to clamp the cables therein. Preferably, the dimensions of the clamp 14, bases 50 and flexible insert 86 are such that when the clamp is closed, the bases 50 will somewhat compress the flexible insert 86 so that the flexible insert 86 is held tightly within the confines of the bases 50 and the individual cables 12 are held tightly within the individual cylindrical cavities 102 of the flexible insert 86.

As can best be seen in FIGS. 4 and 5, one of the heads 96 can have an outer surface 100 with a protrusion 104 which can fit within the aperture 78 in one of the bases 50. This provides a consistent orientation for the insert when a series of clamp assemblies 10 are used along the length of the cable. Also, it prevents twisting and sliding of the insert. Preferably, each of the cables is wrapped with electrician's tape until the outer diameter of the cable is such that the cable fits snugly into the cylindrical cavity 102. Of course, while the flexible insert is shown with five cylindrical cavities to receive five cables, fewer cavities can be formed in the insert if, for example, only four or fewer cables are used or if the cables are larger in diameter. Further, more than five cylindrical cavities can be employed if the cable diameters are smaller.

With reference now to FIGS. 9–14, a modification of clamp assembly 10 will be described. In the modification, the clamp 14 and bases 50 are also employed. However, the flexible insert 86 is replaced by a series of nested inserts 106–116 which are each designed to fit a single cable of predetermined diameter. As will be clear from the discussion below, when sizing the clamp assembly 10 for a particular cable, the inserts having an inner surface of diameter too small for the cable are removed and discarded until an insert having an inner surface with the proper diameter remains on each base 50 to clamp the cable therein. With the six sizes of nested inserts illustrated, a wide range of cable diameters can be accommodated, from the smallest cable that will be secured by the smallest inserts 116 to the largest cable that will be secured by the diameter of the bases 50 if all six inserts are removed from the bases. An unequal number of inserts can be removed from the bases 50 to tailor the clamp assembly 10 to a specific cable. For example, inserts 114 and 116 can be removed from one base while inserts 112–116 are removed from the facing base to best accommodate a specific cable diameter.

With reference to FIGS. 11–14, the largest nested insert 106 will be described. The other nested inserts 108–116 are essentially identical except for size.

Figure 9:
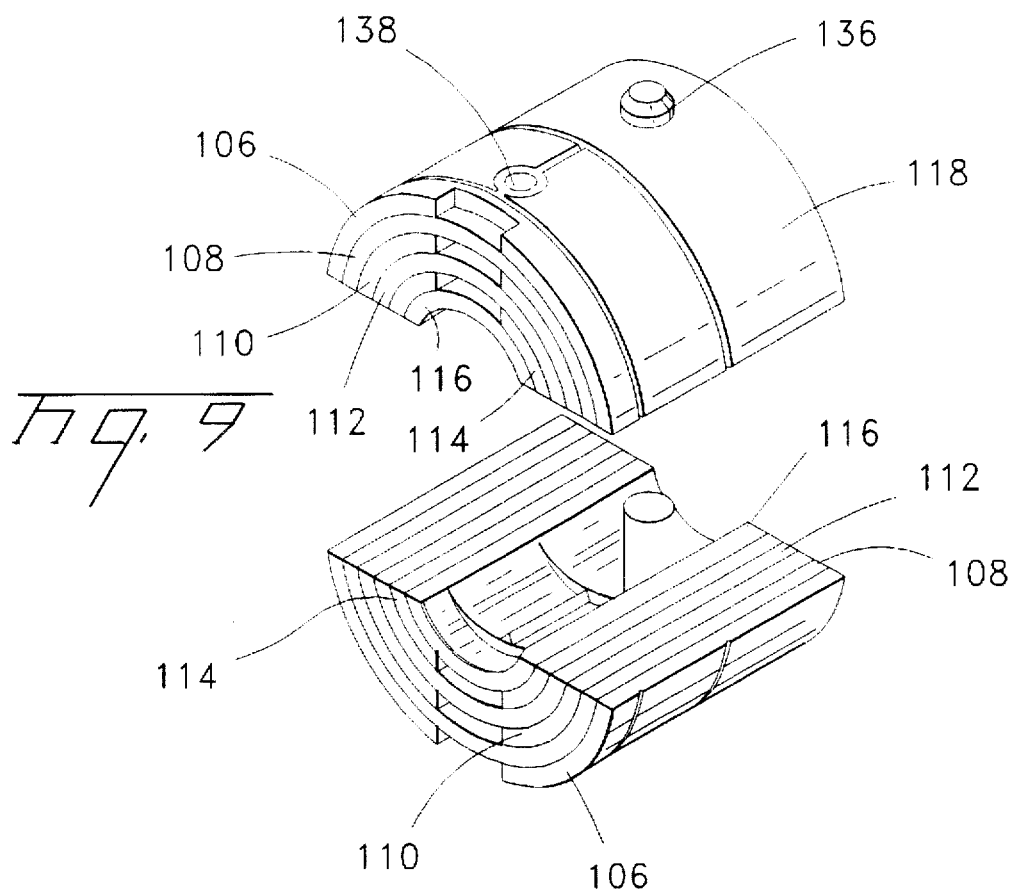
FIG. 9 is a view of nested inserts used in a modification of the clamp assembly.
Figure 10:
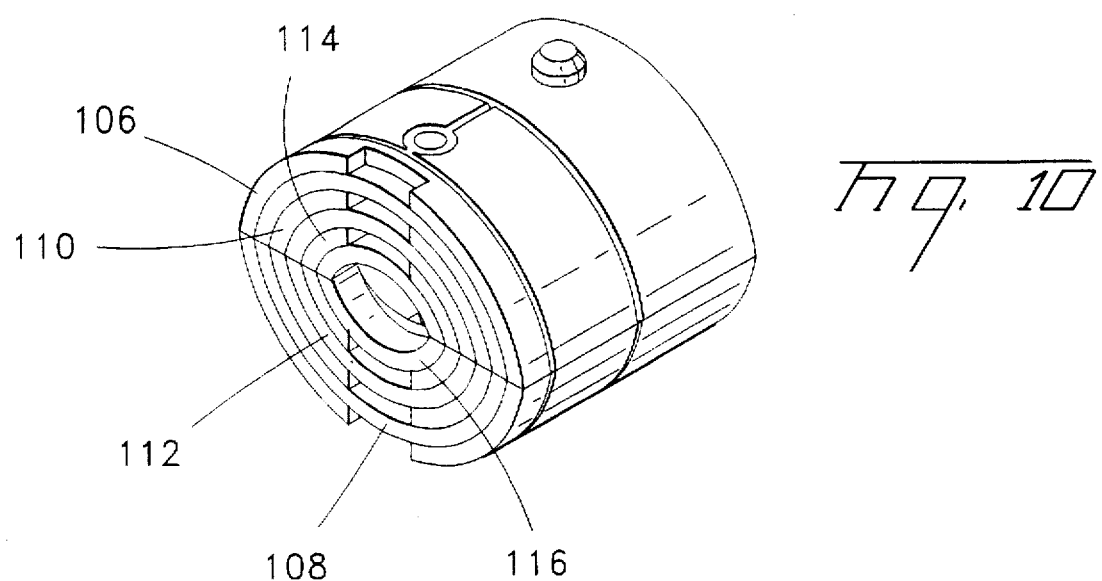
FIG. 10 is a perspective view of the nested inserts.
Figure 11:
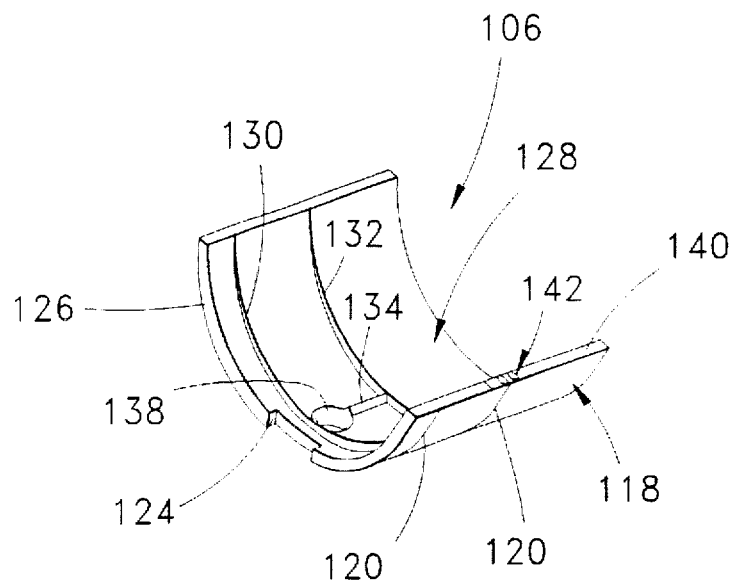
FIG. 11 is a perspective view of one of the nested inserts.
Figure 12:
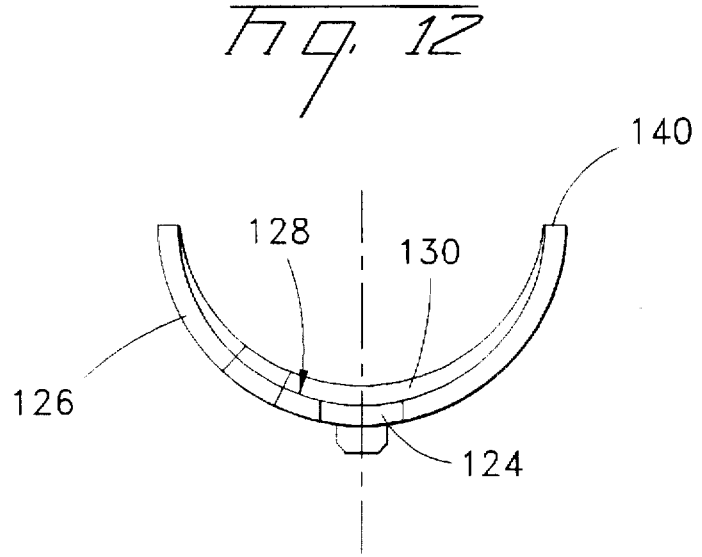
FIG. 12 is an end view of the nested insert.

The nested insert 106 has a semi-cylindrical shape which extends an arc of somewhat less than 180°. The outer surface 118 has a series of notches 120 formed along the circumference of the outer surface 118 and a groove 122 along the length of the outer surface 118 to engage the ridges 72, 74 and 76 on a base 50. A notch 124 is formed in first end 126 of the inserts which facilitates removal of the next smaller insert from its nested position within insert 106. When nested, the slots of each of the inserts alternate from end to end, as best seen in FIGS. 9 and 10. Insert 116 does not have a slot.

The inner surface 128 of the insert 106 has a cylindrical curvature corresponding to the radius of the particular cable to be received. The inner surface has circumferential ridges 130 and 132 and linear ridge 134 which are received in corresponding notches in the next smaller size insert.

A protrusion 136 extends from the outer surface 118 and is received in the aperture 78 in base 50. Similarly, an aperture 138 is formed in the insert 106 through the inner surface 128 to receive a matching protrusion 136 on the next smaller size insert 108. Insert 116 does not have an aperture. For convenience, the diameter of cable for which the insert is designed is printed on the edge 140 of the insert at label 142. Also, preferably, the inserts are numbered sequentially, for example, from one to six, with the number imprinted on the inner surface for ready observation.

By positioning the aperture 138 adjacent the first end 126 of each of the inserts, and the protrusion near the opposite end, it can be seen that the inserts are alternately stacked as shown in FIGS. 9 and 10 so that a fingernail, screwdriver tip or other suitable object can be fit within one of the slots to remove the inserts which are too small for the particular installation. Thus notches and ridges on inserts 106, 110 and 114 are near end 126 while on inserts 108, 112 and 116 they are at the opposite end.

In one clamp assembly 10 formed in accordance with the teachings of the present invention, the clamp 14 is formed of metal. The bases 50 are formed of plastic and have a radius R of 0.562 inch. The six inserts decrease in radius of their inner surfaces from, in sequence, 0.5 inch, 0.44 inch, 0.38 inch, 0.32 inch, 0.26 inch and 0.200 inch. These sizes form an aperture with the facing inserts on both bases 50 of diameter one inch, 0.88 inch, 0.75 inch, 0.63 inch, 0.50 inch and 0.38 inch, respectively. As noted, this range of diameters would be expected to accommodate any cable diameter within the range of 0.38 inch to 1.00 inch as well as slightly larger cables and smaller cables. Of course, electricians tape can be used to build up the diameter of any smaller cable until clamp assembly 10 becomes effective. The nested inserts are formed of molded plastic, specifically polycarbonate. Each of the inserts has a thickness of about 0.060 inch and a length of about 0.9 inch. The flexible insert is made of a soft rubbery plastic such as Kraton and has a radius $R_i$ of 0.565 inch. Each of the cylindrical cavities 102 is 0.4 inch in diameter.

With reference now to FIG. 15, a second modification of the present invention is illustrated. In this modification, an insert 150 is mounted in each base 50 and replaces inserts 86 and 106–116. Each insert 150 has a pair of semi-cylindrical cavities 152 formed therein. The cavities on the opposed inserts 150 are aligned to seize a pair of cables 12 therebetween when the clamp is closed. As can be readily understood, inserts 150 can be modified to have three or more semi-cylindrical cavities, as desired, to hold three or more cables in line.

With all of the variations of strain relief clamps noted, it is preferred to wrap several wraps of electrician's tape about the cable at the point to be clamped and pull the cable with tape wrap into the insert or base to wedge the cable therein to insure the most effective strain relief.

Although several embodiments of the present invention have been illustrated in the accompany drawings and described in the foregoing Detailed Description, it will be understood that the invention is not limited to the embodiments disclosed, but is capable of numerous rearrangements, modifications, and substitutions of parts and elements without departing from the scope and spirit of the invention.

We claim:

1. A clamp for clamping a cable to a support, comprising:

a first clamp half having a base, a hinge portion, a forward portion and a securing portion, the base of said first clamp half having at least one hole therethrough to receive a securing fastener to fasten the clamp to the support;

a second clamp half having a base, a hinge portion, a forward portion and a securing portion;

the first and second clamp halves hinged together at their hinge portions and movable relative each other between an open and closed position; and a member between said clamp halves, said member having a surface for strain relief engagement with said cable with the clamp halves in the closed position.

2. The clamp of claim 1 wherein the member includes a flexible insert having an outer circumference and a plurality of notches formed in the insert, said notches opening through the outer circumference for receiving individual cables therein, the first and second clamp halves engaging the flexible insert at the outer circumference to secure the cables therein in the closed position.

3. The clamp of claim 2 wherein the flexible insert has a projection extending from the outer circumference to orient the flexible insert relative the first and second clamp halves.

4. The clamp of claim 1 wherein the member includes a clamp base mounted on each of said clamp halves, each of said clamp bases having a first projection engaging the forward portion and a second projection engaging the hinge portion, the base having a outer surface engaging the base of the clamp half and a curved inner surface.

5. The clamp of claim 4 wherein the clamp base has at least one ridge extending from the curved inner surface thereof.

6. The clamp of claim 4 wherein the member further includes at least one insert having a curved outer surface engaging the inner surface of the clamp base and an inner surface curved to receive the cable.

7. The clamp of claim 6 wherein said first insert has at least one notch formed in the outer surface thereof, the clamp base having at least one ridge formed in the inner surface thereof, the ridge entering the notch of the first insert.

8. The clamp of claim 6 wherein the first insert has an extension extending from the outer surface thereof, the base having an aperture formed through the inner surface thereof receiving the extension on the first insert.

9. The clamp of claim 6 wherein the first insert has a first end, a notch formed in the first end.

10. The clamp of claim 6 further comprising a second insert having a curved outer surface engaging the inner surface on the first insert and an inner surface curved to receive a cable.

11. The clamp of claim 1 wherein the base of the first clamp half has a plurality of apertures, the apertures being countersunk.

12. The clamp of claim 1 wherein the hinge portion and forward portion of each of said clamp halves has an aperture formed therethrough.

13. The clamp of claim 1 wherein the securing portion of the first clamp half has a threaded rod thereon and the securing portion of the second clamp half has a cutout to receive the threaded rod, the clamp further having a threaded nut for threading on the rod to secure the clamp in a closed position.

14. The clamp of claim 2, wherein the flexible insert is made of thermoplastic rubber.

15. A method for clamping a cable within a clamp, comprising the steps of:

placing the cable between a first clamp half having a portion and a second clamp half having a base, a hinge portion, a forward portion and a securing portion, the first and second clamp halves hinged together at their hinge portions and movable relative each other between an open and closed position;

moving the first and second clamp halves together to the closed position;

securing the base of the first clamp half to a fixed support; and removing nested inserts from each clamp half until an insert is exposed having an inner surface with diameter corresponding to the diameter of the cable to be clamped.

16. The method of claim 15 further comprising the steps of securing the first clamp half to the support by at least two fasteners.

17. The method of claim 16 further comprising the step of orienting the flexible insert with a projection extending therefrom.

18. The method of claim 15 further comprising the step of:

inserting at least one cable within a cylindrical aperture formed through the outer surface of a flexible insert; and placing the flexible insert and cable therein between the first and second clamp halves.

19. The method of claim 18 further comprising the steps of:

inserting a plurality of cables within cylindrical cavities opening through the outer surface of the flexible insert.

20. The method of claim 15 further comprising the step of:

mounting a clamp base on each of said first and second clamp halves, the clamp base having a first projection and a second projection by inserting the first projection of each clamp base in an aperture provided in the forward portion and the second projection of the clamp base within an aperture in the hinge portion to secure the clamp base within the clamp halves.

21. The method of claim 15 further comprising the step of clamping a fiber optic cable between the first and second clamping halves.

22. A clamp for clamping a cable to a support, comprising:

a first clamp half having a base, a hinge portion, a forward portion and a securing portion;

a second clamp half having a base, a hinge portion, a forward portion and a securing portion;

the first and second clamp halves hinged together at their hinge portions and movable relative each other between an open and closed position;

a member between said clamp halves, said member having a surface for strain relief engagement with said cable with the clamp halves in the closed position; and wherein the member includes a clamp base mounted on each of said clamp halves, each of said clamp bases having a first projection engaging the forward portion and a second projection engaging the hinge portion, the base having a outer surface engaging the base of the clamp half and a curved inner surface.

23. A clamp for clamping a cable to a support, comprising:

a first clamp half having a base, a hinge portion, a forward portion and a securing portion;

a second clamp half having a base, a hinge portion, a forward portion and a securing portion;

the first and second clamp halves hinged together at their hinge portions and movable relative each other between an open and closed position;

a member between said clamp halves, said member having a surface for strain relief engagement with said cable with the clamp halves in the closed position; and wherein the hinge portion and forward portion of each of said clamp halves has an aperture formed therethrough.

24. A clamp for clamping a cable to a support, comprising:

a first clamp half having a base, a hinge portion, a forward portion and a securing portion;

a second clamp half having a base, a hinge portion, a forward portion and a securing portion;

the first and second clamp halves hinged together at their hinge portions and movable relative each other between an open and closed position;

a member between said clamp halves, said member having a surface for strain relief engagement with said cable with the clamp halves in the closed position; and wherein the securing portion of the first clamp half has a threaded rod thereon and the securing portion of the second clamp half has a cutout to receive the threaded rod, the clamp further having a threaded nut for threading on the rod to secure the clamp in a closed position.

25. A method for clamping a cable within a clamp, comprising the steps of:

placing the cable between a first clamp half having a base, a hinge portion, a forward portion and a securing portion and a second clamp half having a base, a hinge portion, a forward portion and a securing portion, the first and second clamp halves hinged together at their hinge portions and movable relative each other between an open and closed position;

moving the first and second clamp halves together to the closed position;

securing the base of the first clamp half to a fixed support; and mounting a clamp base on each of said first and second clamp halves, the clamp base having the first projection and a second projection by inserting the first projection of each clamp base in an aperture provided in the forward portion and the second projection of the clamp base within an aperture in the hinge portion to secure the clamp base within the clamp halves.

\* \* \* \* \*

UNITED STATES PATENT AND TRADEMARK OFFICE
CERTIFICATE OF CORRECTION

PATENT NO. : 5,742,982
DATED : April 28, 1998
INVENTOR(S) : Joseph K. Dodd, J.D. Harvey, Mark D. Walters and Kevin Morgan It is certified that error appears in the above-indentified patent and that said Letters Patent is hereby corrected as shown below:

On the title page, Item [75]

Inventors should read as follows:

Joseph K. Dodd, Lee's Summit, Mo.; J.D. Harvey, Trophy Club, Tex.; Mark D. Walters, Colleyville, Tex.; Kevin L. Morgan, Paradise, Tex., Robert W. Dennis, Hurst, Tex.

Signed and Sealed this

Eleventh Day of August 1998

Attest:

*Attesting Officer*

BRUCE LEHMAN

*Commissioner of Patents and Trademarks*